Oct. 4, 1932.  W. S. BRINK  1,880,403
RIM
Filed April 14, 1930   2 Sheets-Sheet 1
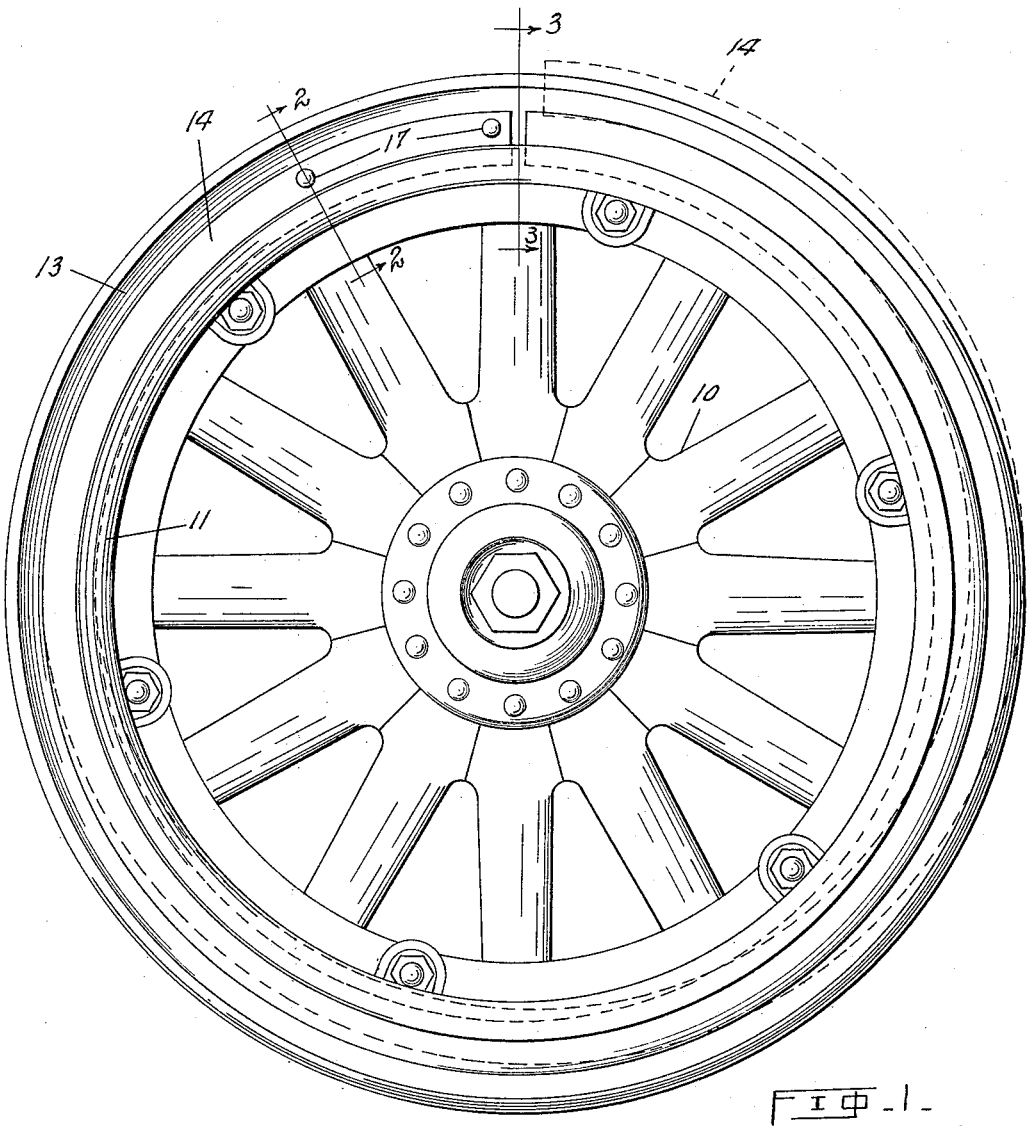
INVENTOR
WINFIELD S. BRINK.
BY
Ely & Barrow
ATTORNEYS.

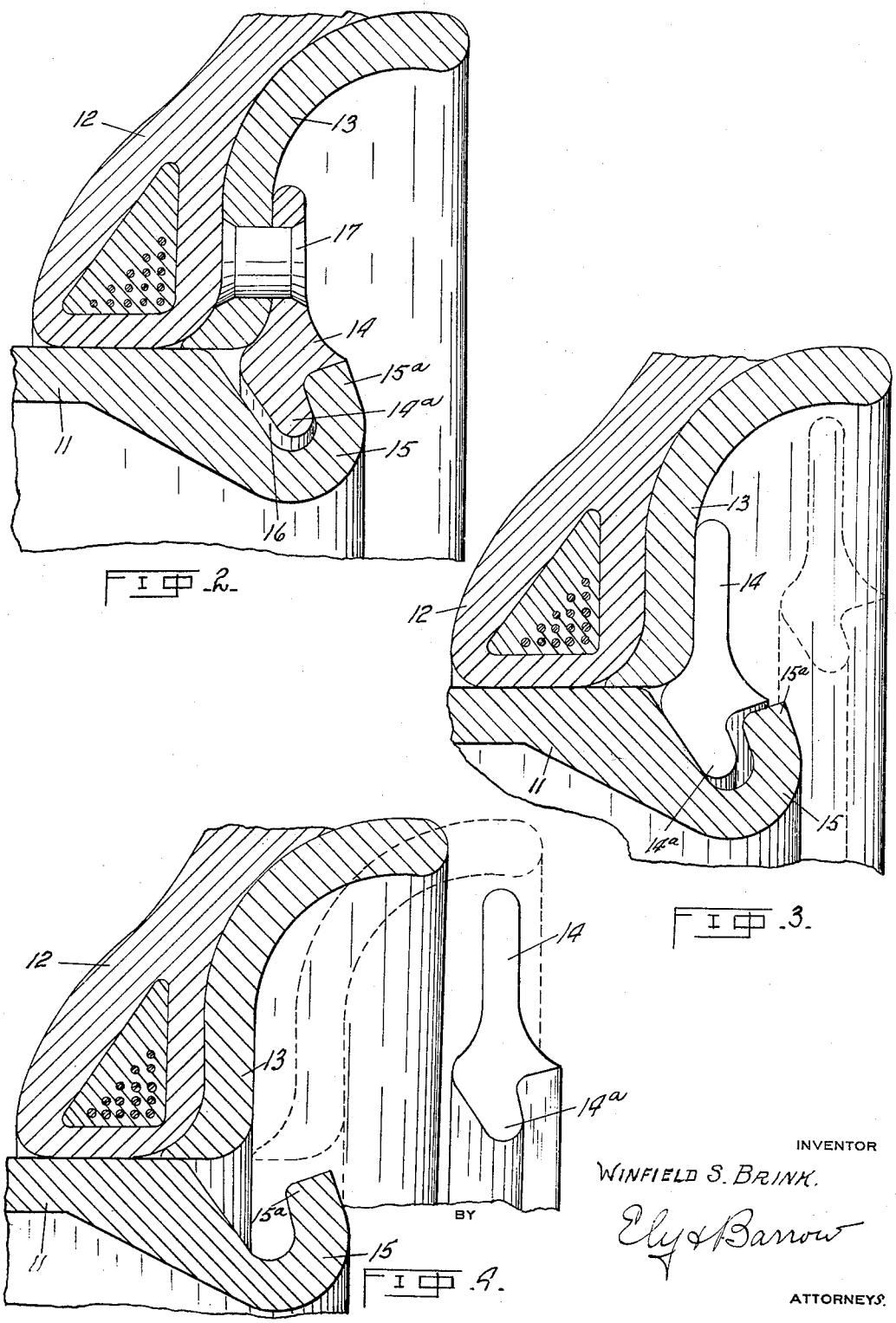

Patented Oct. 4, 1932

1,880,403

UNITED STATES PATENT OFFICE

WINFIELD S. BRINK, OF AKRON, OHIO, ASSIGNOR TO THE FIRESTONE STEEL PRODUCTS COMPANY, OF AKRON, OHIO, A CORPORATION OF OHIO

RIM

Application filed April 14, 1930. Serial No. 444,018.

This invention relates to pneumatic tire carrying rims of the type having a removable side tire-retaining ring which is normally held in place by a locking ring which snaps into a gutter at the edge of the rim. The locking ring is inserted in the gutter when the tire is deflated and is held in place when the tire is inflated by the outward movement of the side ring caused by the pressure in the tire. Heretofore in this construction if the tire goes flat while in use the side ring has tended to slide sideways and thus allow the locking ring to spring out of the rim gutter which means the side ring and tire will be free to slide off the rim.

It is an object of the present invention to overcome the above difficulties of the prior art by the provision of a rim of this type in which the locking ring and the side ring will be securely held in place whether the tire is inflated or not and yet which may be readily removed when necessary.

The above and other objects of the invention are achieved by the apparatus illustrated in the accompanying drawings and described below, it being understood that the invention is not limited to the exact details thereof described and shown.

In the drawings:

Figure 1 is a side elevation of a wheel equipped with a rim embodying the invention;

Figure 2 is an enlarged sectional view taken on the line 2—2 of Figure 1;

Figure 3 is an enlarged sectional view taken on the line 3—3 of Figure 1; and

Figure 4 is a view similar to Figure 3 but showing the locking ring sprung out.

The numeral 10 indicates a wheel adapted to carry a rim 11 which may serve as the wheel felloe or which may be made demountable with respect to the wheel felloe as is well understood in the art.

The rim 11 is adapted to receive a pneumatic tire, the bead portion thereof being indicated at 12, which tire is held in place on the rim by an endless side ring 13. The side ring 13 is prevented from moving laterally off the rim by a split locking ring 14 removably received in a circumferential gutter 15 provided at the edge of the rim. The gutter 15 is formed with an overhang 15a beneath which a rib 14a of the locking ring seats when the tire 12 is inflated. A clearance, indicated at 16 is provided between the locking ring 14 and the gutter 15 so that when the tire 12 is deflated and the side ring 13 and tire are pushed laterally over the rim base as illustrated in Figure 3 the locking ring may be sprung out of the gutter 15.

In the practice of the invention one end of the locking ring 14 is fixed by any suitable means 17 to the side ring 13. Whereas Figure 1 shows the fastening means 17 securing the end of the locking ring only to the side ring, the invention contemplates securing the locking ring and side ring together over a greater arc or at a point remote from the ends, as will be apparent.

In the operation of removing the tire 12 from the rim 11 the tire is first deflated and the side ring 13 and tire are forced over to the position shown in Figure 3 at which point further movement sideways is prevented by the means 17 securing the end of the locking ring to the side ring. With the various parts in this position the locking ring will not spring out by itself but the unsecured end thereof can be lifted and the locking ring thus pulled out of the rim gutter 15 approximately three-quarters of the way around the wheel. The portion of the side ring 13 diametrically opposite the fastening means 17 is now gripped and pulled off the rim, swinging on an arc about the portion of the side ring adjacent the fastening means 17, which portion is still held on the rim by the end of the locking ring 14 secured thereto. The side ring may now be moved radially of the wheel axis and rim to carry the end of the locking ring secured thereto out of the rim gutter 15 whereby the side ring and locking ring will be completely removed from the rim. The tire 12 may now readily be slid off the rim.

The operation is just reversed when the tire is placed back on the rim. The portion of the locking ring and side ring secured together is first inserted in the rim gutter by moving the locking ring radially into the rim gutter and then swinging the remainder of the side ring about the portion already in place, onto the rim. The locking ring is now snapped down into the rim gutter throughout its entire length and the tire is ready for inflation. The outward movement of the sidewalls of the tire due to the inflation pressure forces the side ring and locking ring out to the position shown in Figure 2 of the drawings where they are securely locked by the cooperation of the locking ring and the rim gutter.

With the present construction if the tire should go flat while in operation, the side ring can only move inward on the rim to the position shown in Figure 3 because it is secured to one end of the locking ring. The locking ring will not be able to jump out of the rim gutter, thus the side ring cannot move outwardly off the rim and the tire will be retained on the rim even when the tire is run deflated.

As many changes could be made in the construction particularly with respect to the exact portions of the locking ring secured to the side ring and the specific shapes of the rim gutter and locking ring, it is intended that all matter contained in the above description or shown in the accompanying drawings shall be interpreted as illustrative only and not in a limiting sense. Accordingly, various modifications of the invention can be resorted to without departing from the spirit of the invention or the scope of the appended claims.

What is claimed is:

1. In combination, a pneumatic tire rim having an annular gutter at one edge thereof formed with an overhanging portion, an endless, tire-retaining side ring adapted to pass over said gutter and be carried on said rim, a split locking ring adapted to seat in said rim gutter, said ring being formed with an annular radially inwardly extending rib angled to lie under said overhanging portion of said gutter, means securing one end of said locking ring to said side ring, said locking ring rib and said rim gutter being formed with a clearance permitting lateral movement of said locking rim rib out from under the overhanging portion of said rim gutter and said means securing said split ring and said side ring together, necessitating conjoint lateral movement of said rings to disengage the rib from said overhanging portion to permit radial release of the locking ring from said gutter.

2. In combination, a pneumatic tire rim having an annular gutter at one edge thereof formed with an overhanging portion, an endless, tire-retaining side ring adapted to pass over said gutter and be carried on said rim, a resilient split locking ring adapted to seat in said rim gutter, said ring being formed with an annular radially inwardly extending rib adapted to lie under said overhanging portion of said gutter, and means fixedly securing one end of said locking ring to said side ring.

3. In combination, a pneumatic tire rim having an annular gutter at one edge thereof, an endless, tire-retaining side ring adapted to pass over said gutter and be carried on said rim, a resilient split locking ring adapted to seat in said rim gutter, and means fixedly securing one end of said locking ring to said side ring.

4. In combination, a pneumatic tire rim having an annular gutter at one edge thereof, an endless, tire-retaining side ring adapted to pass over said gutter and be carried on said rim, a split spring locking ring adapted to seat in said rim gutter, and means fixedly securing a portion of said locking ring to said side ring.

5. A rim construction including a rim base formed with a circumferential side gutter formed with an overhanging portion, an endless side ring adapted to be mounted on said rim base over said gutter, and a split locking ring secured to said side ring and formed with a flange adapted to extend under the overhanging portion, said rim gutter and locking ring flange being formed with clearance permitting conjoint lateral movement of said side ring and the locking ring secured thereto to disengage said flange from said overhanging portion to permit radial release of the locking ring from said gutter, whereby the endless side ring and the split locking ring assembly may be removed from the rim base.

6. A rim construction including a rim base formed with a circumferential side gutter, an endless flange adapted to be removably mounted on said rim base over said gutter, and a resilient split locking ring fixedly secured at one portion to the removable endless flange and formed with a rib adapted to snap into said gutter.

WINFIELD S. BRINK.